Dec. 6, 1949 F. L. MELVILL 2,490,080
CONTACTING APPARATUS
Filed May 19, 1944 4 Sheets-Sheet 1

INVENTOR
FRANCIS L. MELVILL
BY Lee Allan Swem
ATTORNEY

Fig. 2.

Dec. 6, 1949  F. L. MELVILL  2,490,080
CONTACTING APPARATUS
Filed May 19, 1944  4 Sheets-Sheet 3

INVENTOR
FRANCIS L. MELVILL
BY Lee Allan Swem
ATTORNEY

Dec. 6, 1949           F. L. MELVILL           2,490,080
CONTACTING APPARATUS
Filed May 19, 1944           4 Sheets-Sheet 4

INVENTOR
FRANCIS L. MELVILL
BY Lee Allan Swem
ATTORNEY

Patented Dec. 6, 1949

2,490,080

UNITED STATES PATENT OFFICE 2,490,080

CONTACTING APPARATUS

Francis L. Melvill, New York, N. Y.

Application May 19, 1944, Serial No. 536,306

14 Claims. (Cl. 261—110)

This invention relates to devices for distributing and dispersing liquid to the packing of a contact tower or chamber. Although the invention has a wide range of utility, it is particularly useful in connection with countercurrent gas and liquid contact flow devices, such as those employed for the absorbing, cooling, drying, cleansing, and humidifying of gases, for the evaporating, cooling and heating of liquids, for effecting catalytic actions, and for other reaction purposes. Such devices may, for example, take the form of fractionating towers, scrubbers, cooling towers, and the like, in which it is desirable to effect substantially equal initial distribution of the liquid, to the packing.

The invention provides a novel apparatus for distributing liquid to the packing of a contact tower, by which the liquid is dispersed and distributed to the packing in a plurality of relatively long, narrow film-like streams. The liquid is delivered to the top of the distributing apparatus by any conventional means and is divided by the distributor into streams which initially may be unequal, but by the process of division and merging of the streams, they are made substantially equal for delivery to the packing disposed below the distributor.

The packing preferably is of a definite predetermined configuration, and is designed to spread and disperse the streams delivered from the distributing device evenly and in regular predetermined manner as they descend in the treating chamber, so that substantially even distribution of the liquid throughout the flow area of the contacting chamber is afforded.

The invention will be understood from the following description when considered in connection with the accompanying drawings forming a part thereof, and in which.

Like characters of reference refer to the same or to similar parts throughout the several views.

Referring to Figs. 1 to 7 of the drawings, the liquid and gas countercurrent contacting device shown, comprises a vertical cylindrical column or tower 10 containing a packing 11. The gas to be contacted is delivered to the lower portion of the tower 10 below the packing 11, and flows generally upwardly through the packing, while the liquid is fed to the upper portion of the tower above the packing, and flows generally downwardly through the packing and in intimate contact with the ascending gas, in a manner to be described. The liquid is delivered to the packing 11 as a series of predetermined spaced thin or fine streams by a distributor 12 embodying features of the present invention which will be more fully described hereinafter. The packing 11 is shown occupying the central portion of the tower 10, while the diametrically opposite side chordal sections 13 of the tower are left vacant or unpacked. A pair of partition plates 14, Fig. 2, on the straight chordal sides respectively of the packing 11, prevent flow into or out of the packing through these sides. The unpacked spaces 13 of the tower 10 may be sealed either at the bottom or the top in any manner well-known in the art, to prevent by-pass flow through these spaces. The clearance between the arcuate peripheral portions on the packing 11 and the corresponding wall of the tower 10 may be sealed by any suitable means, such as glass wool 15.

The packing 11 may be of any suitable or desired form. However, the distributors herein disclosed, are particularly well adapted for use with a packing of a type comprising a series of liquid carriers arranged in accordance with a predetermined recurrent pattern to cause uniform distribution and intermixing of the liquid throughout the flow area of the tower 10, while allowing free circulation of the ascending gas in intimate contact with the liquid. For that purpose, the packing 11 advantageously comprises a series of slender elements arranged in accordance with a predetermined repeat pattern and in a manner to cause the liquid to flow downwardly as a series of thin streams of substantially equal dimensional and motional characteristics. These streams merge at predetermined mixing zones, and then subdivide into predetermined fine similar streams. The packing 11 of the general type referred to may, for example, be similar to that described and claimed in any one of my copending applications Serial No. 521,049, now U. S. Patent No. 2,405,593, granted August 13, 1946; Serial No. 528,541, now U. S. Patent No. 2,424,248, granted July 22, 1947; Serial No. 528,542; Serial No. 529,246, now U. S. Patent No. 2,405,594 granted August 13, 1946, and Serial No. 531,589, but for purposes of illustration, is shown of the type described and claimed in my copending application, Serial No. 528,542, filed March 29, 1944, abandoned as of Nov. 15, 1947.

Figure 6:
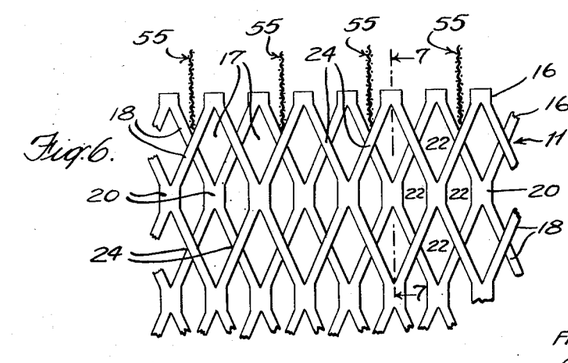
Fig. 6 is a fragmentary front elevation of one form of packing which may be employed in connection with the distributor of the present invention.
Figure 7:
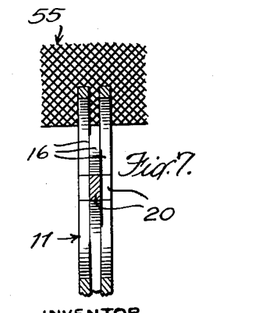
Fig. 7 is a section of the packing taken on line 7—7 of Fig. 6.

The packing 11 selected for illustration, comprises a series of flat vertical sheets 16 disposed in face to face contact, and regularly formed with a plurality of latticed perforations 17 defining mesh openings. The sheets 16 of metal, plastic, or other suitable material, are formed in the manner of an expanded metal lath by providing in a sheet blank a series of regularly arranged, closely adjoining, parallel slits, set in parallel rows with the slits in each row in longitudinal alignment, and with the slits of adjoining rows staggered, preferably simultaneously expanding the blanks to spread the slits into diamond-shaped openings 17, and rolling the sheets after cutting and expanding. The sections 18 of the sheet 16 which intervene between the slits and which enclose the expanded mesh openings 17, are in the form of slender elements, and extend obliquely at equal inclinations with the vertical. These elements 18 are identical in cross-sectional size, length, shape and finish, and their substantially horizontally extending surfaces are of such material as to be substantially wetted by the liquid under normal operating conditions. The opposite faces of the sheets 16 are flat, so that effective face contact between adjoining sheets may be obtained. The sheets 16 are identical, except for widths, and are arranged vertically in face to face contact to form the composite packing 11. The sheets 16 are desirably relatively displaced vertically, so that the mesh openings 17 of one sheet are out of horizontal registry with the mesh openings of adjoining sheets. In the specific form shown, the mesh openings 17 of alternate sheets 16 are in horizontal registry, and the mesh openings of intervening sheets are also in horizontal registry but are medially staggered with respect to the mesh openings of the alternate sheets. In this honeycomb arrangement, the junction zones 20 in one sheet 16 will be centrally disposed with respect to the mesh openings 17 of adjoining sheets, so that each of the mesh openings 17 in one sheet will be divided by the adjoining sheets into four equal spaces 22 through which the gas passes in its general ascension.

With this arrangement, a portion of a stream flowing from a liquid mixing zone 20 along an element 18 in one sheet 16 merges at an intersection zone 24 with a similar portion of the stream flowing from another liquid mixing zone 20 along an element 18 of an adjoining sheet. In this manner, the liquid in one sheet 16 is not only distributed and mixed substantially uniformly throughout the width of said sheet, but is also distributed and mixed with the liquid of adjoining sheets. Substantially uniform distribution and mixing of the liquid throughout the entire horizontal flow section of the packing 11 thereby is assured.

The distributor 12 of the invention shown in Figs. 1 to 5, is adapted to subdivide and deliver the feed liquid to the packing 11 as a plurality of relatively long, narrow, film-like streams which are easily and effectively intermixed and distributed by the packing 11. The liquid preferably is delivered to the top of the distributor 12 by a conventional feed device 30. This feed device 30 may, for example, comprise a series of parallel nozzles 31 fed by a header 32, and provided with discharge openings in the lower portions thereof. The distributor 12 mixes and subdivides the liquid regularly and uniformly into a number of definite predetermined streams of predetermined dimensional characteristics for delivery to the packing 11. The specific form of distributor 12 shown in Figs. 1 to 7, comprises a column of superposed sheets or layers 35 of material such as wire cloth or gauze, having a regular rectangular mesh. All the wire or thread elements of the sheets 35 are equally spaced, extend at equal angles to each other, and are identical in thickness, material and finish. Furthermore, each set of wires or threads comprising the mesh are equally offset in making the weave. The number of meshes to the inch in the sheets will vary with the service, but in no case should the mesh openings be unduly large, as this will allow unrestricted flow of liquid downwards. Preferably such openings should not be more than 50% of the total area and may be appreciably less.

Each gauze layer 35 is corrugated to form alternate V-shaped ridges 36 and furrows or depressions 37 at equally spaced intervals, the successive sections 38 on the sides of these alternate configurations extending obliquely at equal inclinations with the vertical and at an angle which will assure downward flow of the liquid at the desired rate. In the specific form shown, these inclined gauze sections 38 extend approximately at an angle of 45° with the horizontal. The size of the corrugations 36 and 37 depend on the size of the unit, the viscosity and other characteristics of the liquid, and the nature of the processing operation to be carried out. In the specific form shown, the horizontal distance between the successive crests 40 of adjoining ridges 36 may be about two inches. The layers 35 are disposed in the column with their crests in the same horizontal plane and with the bottoms of their depressions in the same horizontal plane.

Figure 4:
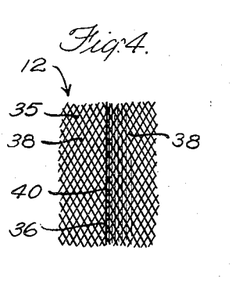
Fig. 4 is an enlarged top plan view of a portion of a wire gauze layer forming part of the liquid distributor.

In order to prevent channeling of the liquid horizontally or vertically along the cross wires or thread elements of the gauze sheets 35, all of these wires or elements desirably extend at the same angle with respect to a vertical plane at right angles to the crests 40 as shown in Fig. 4. Any channeling of the liquid along these wire elements will therefore be in such oblique directions as to assure thorough intermixing of the liquid at the intersecting regions, and subdivision of the liquid as it flows away from these regions.

The gauze layers 35 are arranged in horizontal tiers with alternate layers reversed with respect to intervening layers, so that the apical bottoms of the depressions or furrows 37 of an upper layer rest directly on the apical crests 40 of the ridges 36 of the next lower layers. Superposed layers 35 may be secured together against relatively horizontal movement in any suitable manner, as for example by spot welding these layers together at appropriate points on the abutting apices. The liquid discharged by the feed device 30 on the top layer 35 of the distributor 12 is directed to the valleys or depressions 37 of this layer, and flows towards the bottom of these depressions. The two liquid filmiform streams flowing along any pair of downwardly converging oblique layer sections 38, merge at the bottom intersecting region of these sections. The merged liquid streams at this region, pass to the crest 40 of the ridge 36 of the next lower layer 35, become substantially equally subdivided between the inclined sections 38 of the layer diverging downwardly from the crest, and flow therealong towards the next liquid mixing zones. The substantially even split of the liquid reaching each crest 40 has the effect of distributing it substantially equally to the two oblique layer sections 38 diverging downwardly from the crest, and the equal inclination of the wire elements in these layer sections has the effect of assisting in the substantial uniform distribution of the liquid in each of the sections in directions parallel to the crest. The operation of mixing, subdividing and redistributing the liquid films is repeated regularly in accordance with a predetermined pattern, as these films flow downwardly through the distributor 12. The number of gauze layers 35 required to effect the necessary equalization of flow is dependent upon the nature of the liquid and the extent to which the liquid at the top has been distributed and subdivided by the conventional feed device 30 before the liquid has been discharged onto the distributor 12.

The column of gauze layers 35 is supported on a horizontal tray 45 of suitable material, which is provided with a series of equally spaced elongated slots 46 of predetermined equal width. These slots 46 extend parallel to the corrugations 36 and 37 of the gauze layers 35, and define regions where the liquid is collected for further subdivision and distribution before being discharged onto the packing 11 as will hereinafter be described more fully. The corrugations 36 and 37 in the gauze layers 35 are so horizontally positioned with respect to the longitudinal center lines of the slots 46 that each center line is vertically below a vertical row of contact lines defined between the abutting ridges 36 and depressions 37 of adjacent gauze layers 35. As shown, the spacing between these tray slots 46 is such that the bottom gauze layer 35 has every other ridge 36 disposed centrally over a respective slot, and the intervening ridges are disposed centrally between adjacent slots, but other spacings may be employed so long as crests of ridges are in vertical alignment with the slots at regular intervals thereof. This connotes a distance between slots which is an exact multiple of the distance between crests. Midway between adjacent slots 46 are equally spaced ribs 47 which extend parallel to the slots, and project upwardly from the upper side of the tray 45. These ribs 47 provide dams to avoid mixing of the liquid streams reaching the sections of the tray 45 on either side of the ribs. The tray 45 desirably comprises a series of separate oblong intermediate sections 48 and separate oblong sections 49, 50 and 51 at each end, all of these sections being disposed in the same horizontal plane and being separated by gaps to define the slots 46. These tray sections are held in position by any suitable means, as for example suspension rods 52, fastened at their lower ends to these sections, and anchored at their upper ends to the roof of the tower 10. The composite outline of the tray 45 corresponds to that of the gauze layers 35, and depends on the configuration of the packing 11 below. In the specific form shown, since the packing 11 has a cross-section bounded on two opposite sides by the circular tower wall, and on the other two sides by the chordal partition plates 14, the gauze layer stack has a horizontal elongated cross-section extending centrally over the packing 11 with its longitudinal sides substantially parallel to the straight chordal sides of the packing. The width of the stack of gauze layers 35 between its main central longitudinal sides is less than but directly proportional to the width of the packing 11 between its chordal sides, and in specific form shown, is one-half that of the packing.

Figure 1:
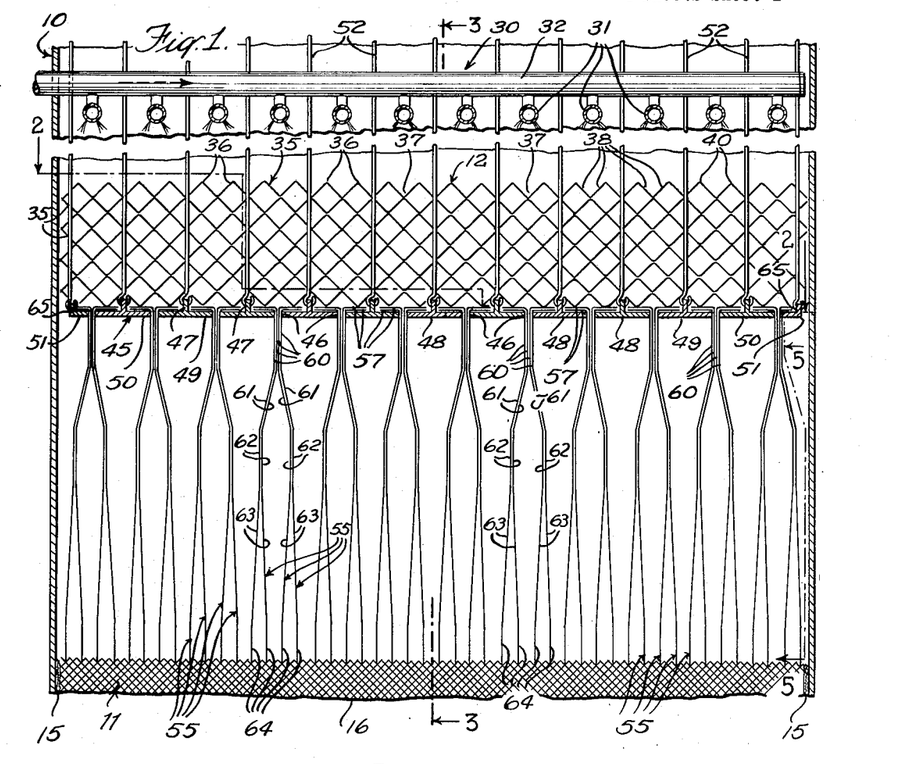
Fig. 1 is a fragmentary vertical section, somewhat diagrammatic, of a portion of a processing tower taken along line 1—1 of Fig. 2, and shows therein a form of initial liquid distributor embodying the structural features of the present invention.
Figure 2:
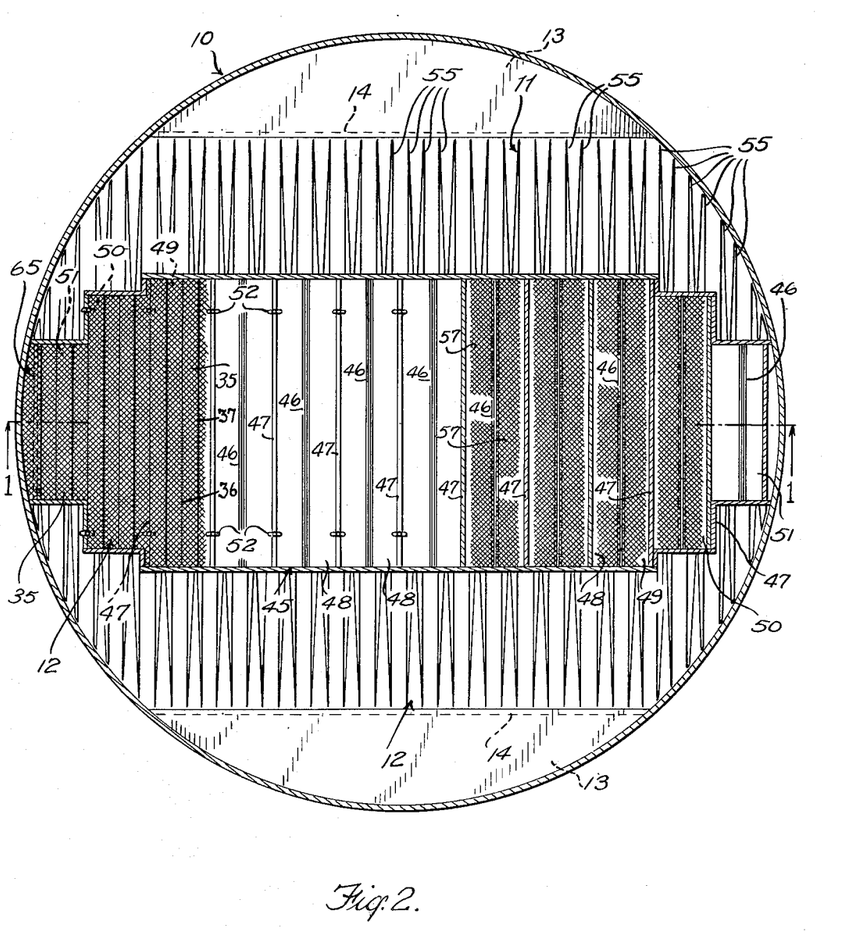
Fig. 2 is a horizontal section taken along line 2—2 of Fig. 1.

At the ends of the stack of gauze layers 35 near the circular wall of the tower 10, they are stepped horizontally as shown in Fig. 2, to effect proportionate distribution of the liquid to the sections of the packing 11 beyond the partition plates 14 according to the varying widths of the packing at these sections, as will be described more fully hereinafter. The intermediate tray sections 48 extend the full corresponding width of the gauze layers 35, while the end tray sections 49, 50 and 51 are stepped at their sides to conform with the stepped configuration of the gauze layers 35.

Figure 3:
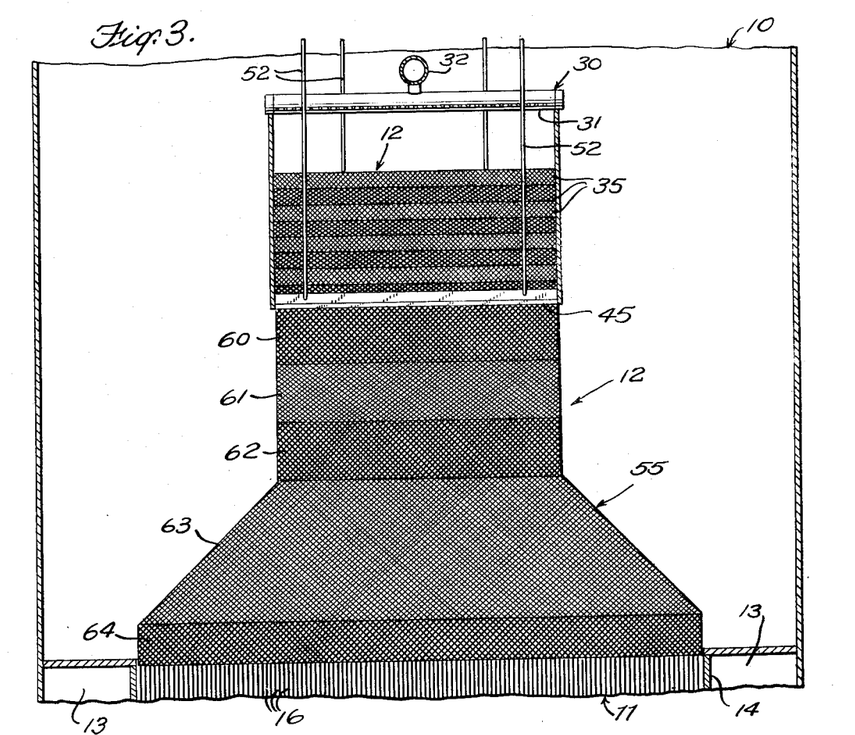
Fig. 3 is a fragmentary vertical section, somewhat diagrammatic, of a portion of the processing tower, taken along lines 3—3 of Fig. 1.

The liquid delivered to any one slot 46 will be substantially evenly distributed therealong. To maintain and improve this distribution between the liquid collection regions at the tray slots 46 and the regions where the liquid is discharged onto the packing 11, there is provided one or more liquid carriers 55 depending from each of these collection regions. In the specific form of the invention shown in Figs. 1 to 7, there are provided four of these carriers 55 depending from each of the slots 46, and regularly arranged in accordance with a predetermined pattern to define regular predetermined external flow paths along which the liquid is adapted to flow downwardly in definite exposed filmiform streams of substantially equal thicknesses. Each of the liquid carriers 55 is desirably in the form of a sheet made of gauze material, such as that employed in the layers 35, with the component wires or elements of these sheets forming an equal angle with the vertical, as shown in Fig. 3, to prevent horizontal and vertical channeling of the liquid and to assist in the uniform distribution of the liquid across the full width of the sheets. In Fig. 3, the angle at which the wires or elements extend to the vertical, is shown as approximately 45°.

The gauze sheets 55 are suspended from the tray 45, and are supported from the slots 46, desirably by extending the upper sections of these sheets through the slots and turning the upper edges 57 of these sheets horizontally as shown, so that these outturned edges rest on the tray 45. These outturned edges 57 also serve to convey by surface action the liquid deposited on the trays 45 towards the depending sections of the sheets, and to spread the liquid before it reaches the depending sections. The four gauze sheets 55 in each group are arranged with upper vertical sections 60 in face to face contact. From the lower ends of these contacting sections 60, the sheets 55 of each group branch into two pairs. The two branch pairs have their upper sections 61 diverging downwardly at equal inclinations, the two sheets 55 of each pair along these sections 61 being in face to face contact. Below these inclined sections 61, the two sheets 55 of each pair have vertical sections 62 in face to face contact, and from the lower ends of these vertical sections 62, the two sheets of each pair spread out divergingly downwardly along sections 63 at equal inclinations. The lower sheet sections 64 extend vertically downwardly from the lower ends of the inclined sheet sections 63. These lower vertical sections 64 are equally spaced apart a distance corresponding to the distance between adjoining groups of sheets 55, so that all of the sheets of the distributor 12 will be equally spaced. The sections 60, 61 and 62 of each gauze sheet 55 are rectangular in outline and of the same width. The inclined section 63 flares downwardly to merge with the rectangular vertical bottom section 64 which is coextensive in width with the width of the packing 11 directly below it. The sides of these inclined sheet sections 63 flare downwardly at an angle which will permit the liquid descending downwardly therealong to distribute itself uniformly to the sides. This inclination of the sides of the sheet sections 63 depends on the viscosity of the liquid being treated and in a specific case may be 45° with the horizontal.

The liquid is deposited by the column of gauze layers 35 on each section of the tray 45 between a pair of adjoining ribs 47 as two equal streams on opposite sides of the slot 46 between the ribs. These two liquid streams are merged and collected at this slot 46, and are picked up by the group of four gauze sheets 55 at this slot. Due to surface effects, the liquid will tend to spread, equalize and distribute itself equally among the four sheets of a group, assuming that these sheets have the same size and shape, as is the case with the intermediate group. In the end groups where the sheets of each group vary in size and shape, the liquid distribution will be proportional to the width of the sheets 55, as will be described more fully hereinafter.

Due to the verticality of the contacting sheet sections 60, and the oblique inclination of the wire elements with respect to the vertical plane, the liquid as it flows downwardly along the sections 60 distributes itself equally among the four sheets 55 of the group. At the bottom of the vertical sections 60, the liquid will divide itself into two streams of equal cross-sectional size and shape. Each of these streams will flow over the surfaces of the two branch sheets 55 along their inclined sections 61, and then along the vertical sections 62 before being subdivided along the inclined sections 63. The flow of the liquid over the two contacting sheets 55 of each pair along the sections 61 and 62 causes equalized divisions and distribution of the liquid between the two contacting sheets 55 before the liquid starts to flow along the diverging branches 63. The liquid is discharged from each of the vertical end sheet sections 64 as a thin vertical curtain stream. The cross-sectional size and shape of the curtain streams discharged from the lower ends of the sheets 55 directly over the section of the packing 11 between the partition plates 14 will be the same.

It should be noted that before the liquid is divided at any branch region, the sections of the sheets 55 directed downwardly towards the region extend vertically. For example, the liquid is branched off along the inclined sheet sections 61 after travelling along the vertical sheet sections 60, and is further subdivided and branched off along the inclined sheet sections 63 after travelling along the vertical sheet section 62. The purpose of providing these vertical flow sections 60 and 62 preliminary to the branching of the liquid is to assure equalized division of the liquid at the branch points.

The lengths of the tray slots 46 are such, that the volume of liquid delivered to each slot is proportional to the average width of the discharge ends of the four sheets 55 along which the liquid streams are adapted to be delivered to the packing 11 from each slot. Thus, for the gauze sheets 55 directly above the portion of the packing 11 between the partition plates 14, the width of the slots 46 from which these sheets depend is one-half the width of the packing 11 between these plates. The gauze sheets 55 disposed outwardly of the partition plates 14, vary in length according to the chordal width of the sections of the packing 11 directly below the sheets, and the end slots 46 from which these sheets depend are equal in length to one-half the average lengths of the discharge ends of the four sheets 55 suspended from each of the slots. To effect this proportional relationship between the length of the slots 46, and the widths of the lower discharge ends of the corresponding gauze sheets 55, the end tray sections 49 and 50 are stepped along their sides. The tray section 49, for example, has an inner portion of a width coextensive with the width of the intermediate tray sections 48, in order that the slot 46 separating the stepped tray section from the adjoining intermediate tray section 47 will be of maximum width. This dimensional relationship is desirable, since the lower discharge ends of the four gauze sheets 55 extending from this slot 46 are all of the same width and are coextensive with the width of the packing 11 between the partition plates 14. The next stepped tray section 50 has its radially inner portion coextensive in width with the width of the reduced radially outer portion of the tray section 49, and these portions are so dimensioned that the slot 46 intervening between these portions has a length which is proportional to the average length of the lower discharge ends of the four gauze sheets 55 depending therefrom. As illustrated, the slot 46 just referred to is half the average length of the lower ends of the sheets 55 depending therefrom. The last tray section 51 is also proportioned according to the width of the lower discharge ends of the four gauze sheets 55 depending from the end slot 46 separating the tray section 51 from the adjoining tray section 50. This end tray section 51 has a rib 65 along its outer side to prevent the liquid deposited on the tray section from spilling over the outer edge thereof.

Figure 5:
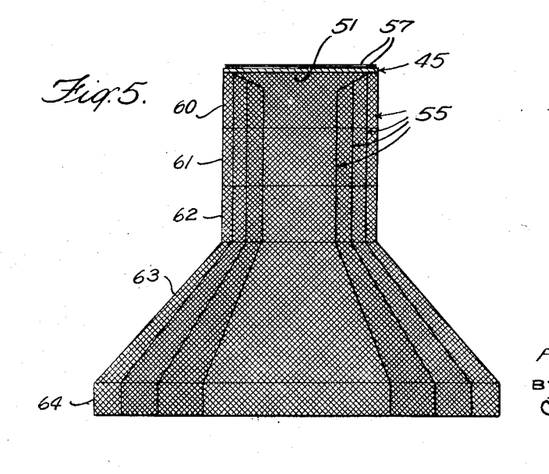
Fig. 5 is a detail vertical section taken on line 5—5 of Fig. 1.

The horizontal outline of the gauze layers 35 conforms with the entire horizontal outline of the tray 45 including its stepped sections 49 and 50. The liquid deposited on the section of the tray 45 between any two adjoining ribs 47 by the gauze layers 35 will be proportioned to the length of the slot 46 between the ribs. The liquid reaching each slot 46 will be distributed equally between the four corresponding gauze sheets 55 at their upper ends. The liquid will tend to distribute itself equally across each sheet 55 as it flows downwardly, and the liquid discharged from the lower end of each sheet will be proportional to the width of said latter sheet at its lower end, and the width of the section of the packing 11 directly below it. Where sheets 55 of different discharge widths are supported from one of the reduced end slots, these sheets at their upper ends will be the same width to fill up the slot space, but then are reduced according to the width of their lower discharge end, as shown in Fig. 5. Due to surface effects, the liquid will tend to distribute itself across the surface of the four sheets 55 of a group according to the areas of the sheets, so that each sheet will receive substantially an amount of liquid which is proportionate to the width of its lower discharge end. The volume of liquid discharged per unit of sheet width 55 therefore will be substantially uniform for all the sheets 55 of the distributor 12.

With the form of packing shown in Figs. 6 and 7, the lower discharge ends of the sheets 55 desirably extend downwardly into the troughs formed at the upper ends of the packing, so that they are close to the bottoms of these troughs, as shown in these figures of the drawings. This arrangement has the desirable effect of delivering the liquid in the form of curtain streams of uniform cross-sectional unit volume to predetermined equally spaced sections of the packing 11 without splashing the liquid as it is deposited on the packing. This relative arrangement of the gauze sheets 55 with respect to the packing also serves to position and maintain the sheets accurately against swaying. The liquid discharged from the distributor gauze sheets 55 as a series of fine curtain streams of predetermined cross-sectional sizes and shapes, is further distributed by the packing 11 in a uniform manner in accordance with a predetermined repeat pattern as already described, to cause equalized mixing and distribution of the liquid throughout the flow area of the tower 10 and to effect intimate contact between the ascending gas and the descending liquid. The liquid discharged on the packing 11 in the manner described will be distributed evenly and uniformly throughout the cross-sectional area of the packing near the top thereof, so that the overall effectiveness of the packing is increased.

The shape and arrangement of the distributor 12 with respect to the packing 11 is such as to permit the free passage of the gas upwardly from the top of the packing through the spaces between the sheets 55, out through the sides of these sheets and upwardly along the longitudinal sides of the gauze layers 35.

Figure 8:
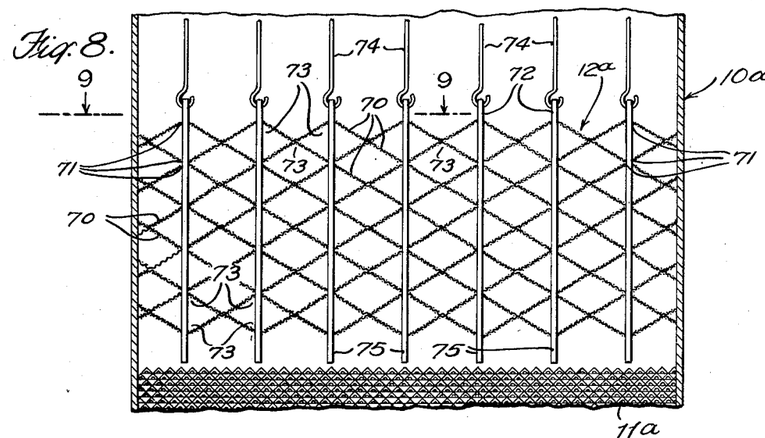
Fig. 8 is a fragmentary vertical section, somewhat diagrammatic, of a portion of a processing tower, and shows therein another form of initial liquid distributor embodying the invention.
Figures 9, 10, 11:
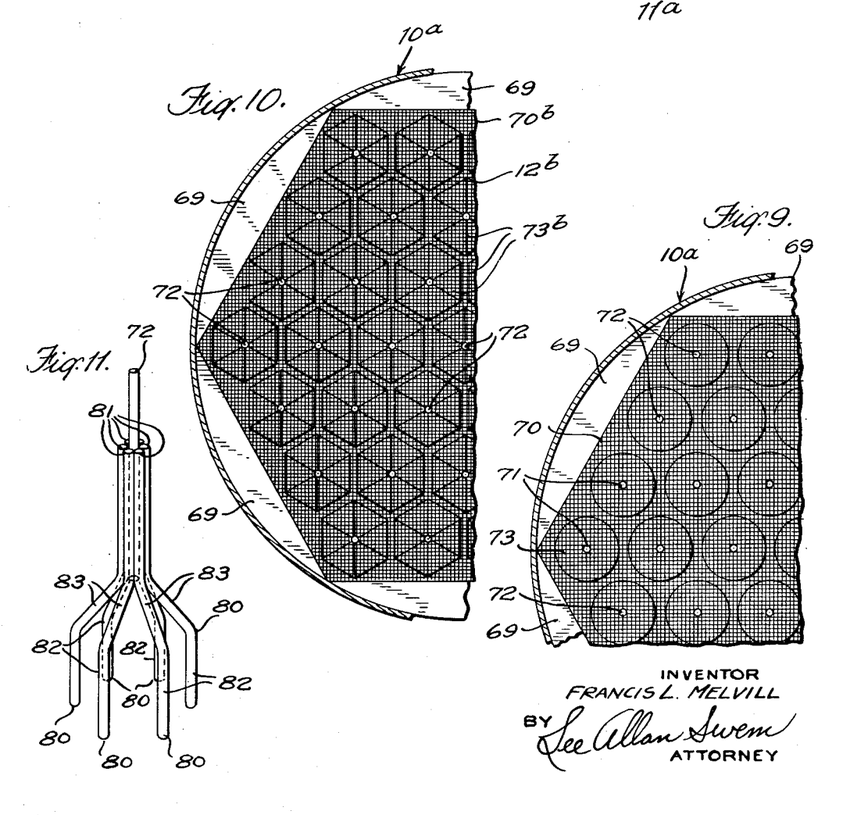
Fig. 9 is a horizontal section of the distributor of Fig. 8, taken approximately along line 9—9 thereof, and showing one form of wire gauze layer.
Fig. 10 is a horizontal section of the distributor of Fig. 8, similar to that of Fig. 9, but showing another form of wire gauze layer.
Fig. 11 is a perspective view of liquid carrier elements which may be connected to the distributor of Fig. 8, to subdivide each of the streams discharged from the distributor into a series of smaller streams.

Figs. 8 and 9 show another form of distributor which, as far as certain aspects of the invention are concerned, may be used in connection with a packing of the general type shown in Figs. 6 and 7, but which is shown in connection with a packing 11a of the general type disclosed in the Stedman U. S. Patent 2,047,444, granted July 14, 1936, and Bragg U. S. Patent 2,290,162, granted July 21, 1942. The packing 11a illustrated comprises a series of superposed sheets of capillary material such as gauze of metal or other material, having pyramidal indentations arranged in rows, the pyramids in each row being staggered with respect to those in adjacent rows. These gauze sheets have gas passages in the form of apertures which are arranged in rows, with the passages in each row being staggered with respect to those in adjacent rows and with the aperture located intermediate pyramids in adjacent rows. With this arrangement, the liquid streams delivered to the top of the packing 11a are repeatedly subdivided and recombined as they flow downwardly through the packing, and the liquid is distributed substantially uniformly throughout the flow area of the packing. The tower 10a for receiving such a packing 11a may, for example, be cylindrical in shape and may be provided with chordal segments 69 hexagonally arranged as shown in Fig. 9, to enclose snugly the packing in hexagonal prismatic form.

The distributor 12a in the form shown in Figs. 8 and 9, comprises a column of superposed horizontal sheets or layers 70 made of capillary material, such as wire gauze, having mesh openings small enough to allow the liquid deposited thereon to flow freely in all directions over the surface thereof. For that purpose, the mesh of the layers 70 is desirably greater than 40 to the linear inch. The feed liquid may be delivered to the top of the distributor 12a in scattered form by a conventional feed device similar to that described in connection with the construction of Figs. 1 to 7.

Each gauze layer 70 is regularly shaped as will be described, and is formed with holes 71 accommodating similar vertical wires, rods or other such slender elements 72, which are of suitable size to carry liquid streams therealong, and which are supported by any suitable means, such as suspension rods 74. The number of the holes 71 and consequently of the rods 72 will be determined by the number of streams of liquid in which it is desired to divide the main bulk of the liquid. These rods 72 will be of uniform cross-sectional size and shape and will be equally spaced. The section of the gauze sheet 70 around each hole 71 is stamped or embossed with a regular tapering depression 73 having the hole as its apical center. The inclination of the walls of these depressions 73 is such as to tend to drain the liquid towards the rods 72 or away from them according to whether the depressions are directed upwardly or downwardly. The depths of the stampings 73 will be a factor in determining the capacity of the distributor 12a. The tapering depressions 73 may be of any suitable geometric shape as long as they are all the same, and extend with their vertex axes vertical. The horizontal outline of the column of gauze sheets 70 may be hexagonal as shown, to conform with the packing 11a, or may be of any other regular shape, such as circular or triangular.

The sheets 70 of gauze or capillary material made as described, are assembled by mounting them on the rods 72 so that the embossed or stamped depressions 73 of successive sheets project in opposite directions alternately upwardly and downwardly. By means of this arrangement, a portion of the liquid in passing from an upper gauze layer 70 to the next lower one flows along the inclined walls of the downwardly facing depressions 73 in the upper layer obliquely downwardly and outwardly from the rods 72, and returns to the rods on the lower layer along the inclined walls of its upwardly facing depressions 73. The streams flowing away from the rods 72 mix with similar streams from adjacent rods, and then return to the rods. A portion of the liquid flows along the rods 72 between the vertices or tips of the depressions 73 encompassing these rods. At the vertex zones, the liquid streams of definite volumes from the inclined depression walls and the rods 72 are merged and intermixed. The liquid from these mixing zones is then subdivided and distributed between the inclined depression walls and the sections of the rods 72 leading downwardly away from the zones. This method of distribution of the liquid tends to equalize the flow of liquid throughout the distributor 12a so that where the rods 72 pass through the lower gauze layer 70, each rod carries substantially the same volume of liquid as each of the other rods. The liquid is collected at the lower ends 75 of the rods as a series of streams of equal volume, and these streams are discharged onto the packing 11a at equally spaced predetermined sections thereof. The position of these discharged streams relative to the elements of the packing 11a depends on the nature of the packing. Although the rods 72 are shown of cylindrical shape, they may be of any suitable surface configuration. For example, the liquid carrying capacity of these rods 72 may be increased by the use of some form of extended surface, such as is afforded by fluting the rods, by applying some design on the surfaces thereof, or by making up the rods from smaller strands of wire twisted or wound in any well-known manner.

In the form of the invention shown in Figs. 8 and 9, the depressions 73 are of right conical shape. In the form of the invention shown in Fig. 10, the depressions 73b in the gauze layers 70b of the distributor 12b are of right pyramidal shape, and are shown specifically in the form of right hexagonal pyramids. In all other respects, the construction and operation of the distributor 12b is similar to that described in connection with the distributor 12a in the construction of Figs. 8 and 9. From each of the collection regions 75, the liquid stream may be further subdivided into a number of equal smaller streams symmetrically arranged. In the specific form shown in Fig. 11, further uniform subdivision of each rod stream is effected by a series of tributary wire or rod liquid carriers 80 grouped symmetrically about the lower end of each main flow rod 72, and formed with upper vertical sections 81 arranged around and in contact with the rod end, and lower vertical finger discharge sections 82 offset radially outwardly from their upper sections by inclined sections 83. Groups of these liquid carrier rods 80 are secured to each main rod 72 in any suitable manner, as for example by welding their upper sections 81 to the rod 72.

The number of supplementary liquid carrier rods 80 secured to each main rod 72 depends on the spacing of the rods 72. In the specific form shown, six of these supplementary rods 80 are shown arranged 60° apart around each main rod 72. These supplementary rods 80 are of equal size and shape, and although they are shown of circular cross-section with plain peripheral surfaces, these may be of any other design to provide extended surfaces affording corresponding increases in liquid carrying capacity, as previously described in connection with the design of the main flow rods 72. The lower discharge ends 82 of the supplementary rods 80 are substantially equally spaced over the packing 11a, and each will carry the same amount of liquid to the packing at spaced predetermined sections thereof. To prevent the dripping of the liquid from the lower ends of the main rods 72, these lower rod ends desirably extend above the inclined sections 83 of the supplementary rods 80. To aid further in preventing dripping of the liquid from the main rods 72, the lower ends of these rods are provided with curved recesses respectively. If the supplementary arrangement shown in Fig. 11 is provided, the main rods 72 will be spaced above the packing 11a a distance necessary to receive the supplementary flow rods 80 as described. This distance will be greater than that shown in Fig. 8 in connection with a construction having no such supplementary rods.

Since many changes can be made in the apparatus disclosed herein, and many apparently widely different embodiments of this invention can be made without departing from the scope of the claims, it is intended that all matter contained in the above description or shown in the accompanying drawings shall be interpreted as illustrative and not in a limiting sense.

What is claimed is:

1. A liquid distributing device for a packed tower comprising a series of gauze members having mesh openings small enough to allow the free flow of the liquid throughout the surfaces of said members, and arranged in accordance with a predetermined pattern to disperse the liquid substantially uniformly, tray means for collecting the liquid at spaced predetermined regions as a series of streams of substantially predetermined cross-sectional sizes and shapes, and a series of liquid carriers depending from and in communication with said tray means, the carriers being disposed in spaced substantially vertical planes and regularly arranged in accordance with a predetermined pattern, said carriers defining regular predetermined external flow paths along which the liquid is adapted to flow downwardly in definite exposed streams of substantially predetermined cross-sectional sizes and shapes towards the packing.

2. A liquid distributing device for a packed tower comprising a column of superposed layers of capilliary material for effecting substantially uniform dispersion of the liquid, each layer having a series of alternate turns defining alternate peaks and bases, the peaks of one layer being in substantial vertical alignment with the bases of the adjoining layers above and below it, tray means for collecting the liquid at spaced predetermined regions as a series of streams of substantially predetermined cross-sectional sizes and shapes, and a series of liquid carriers depending from and in communication with said tray means, the carriers being disposed in spaced substantially vertical planes and regularly arranged in accordance with a predetermined pattern, said carriers defining regular predetermined external flow paths along which the liquid is adapted to flow downwardly in definite exposed streams of substantially predetermined cross-sectional sizes and shapes towards the packing.

3. A liquid distributing device for a packed tower comprising a column of superposed layers of capillary material for effecting substantially uniform dispersion of the liquid, each layer being corrugated to form alternate channels, the layers being arranged in alternate reverse relationship so that the crests of the channels in a lower layer are opposite and adjacent to the respective bases of the channels of an upper adjoining layer, a series of horizontal trays extending alongside of each other below said column and adapted to collect the liquid dispersed by said column, the trays being separated by longitudinal spaces through which the collected liquid is adapted to flow in the form of curtain streams, and a series of liquid carriers depending from said spaces and regularly arranged in accordance with a predetermined pattern, said carriers defining regular predetermined external flow paths along which the liquid is adapted to flow downwardly in definite exposed streams of substantially predetermined cross-sectional sizes and shapes towards the packing.

4. A liquid distributing device for a packed tower comprising a column of superposed layers of capillary material for effecting substantially uniform dispersion of the liquid, each layer being corrugated to form alternate channels, the layers being arranged in alternate reverse relationship so that the crests of the channels in a lower layer are opposite and adjacent to the respective bases of the channels of an upper adjoining layer, a series of horizontal trays extending alongside of each other below said columns and adapted to collect the liquid dispersed by said column, said trays being separated by narrow spaces through which the collected liquid is adapted to flow in the form of curtain streams, and a group of capillary sheets depending from each of said spaces, and spaced at their lower ends from each other and from the sheets of adjoining groups by substantially equal distances, said sheets defining external flow paths along which the liquid is adapted to flow downwardly in definite exposed curtain streamlets of substantially predetermined cross-sectional sizes and shapes towards the packing.

5. A liquid distributing device for a packed tower comprising a column of superposed capillary gauze layers for effecting substantially uniform distribution of the liquid, each layer being corrugated to form alternate channels, the layers being arranged in alternate reverse relationship, so that the crests of the channels in an upper layer are opposite and adjacent to the respective bases of the channels of a lower adjoining layer, a series of horizontal tray sections extending alongside of each other below said column, and adapted to collect the liquid dispersed by said column, each of said tray sections having a dam extending medially and longitudinally from the upper surface thereof, said tray sections being separated by longitudinal spaces through which the collected liquid is adapted to flow in the form of curtain streams, and a group of capillary gauze sheets depending from each of said spaces and offset at their lower sections to interspace said sheets from each other and from the sheets of adjoining groups by substantially equal distances, said sheets defining external flow paths along which the liquid is adapted to flow downwardly in definite exposed curtain streams of substantially equal cross-sectional unit volume towards the packing.

6. A liquid distributing device for a packed tower comprising means for uniformly dispersing, merging and subdividing a liquid feed and collecting the subdivisions at spaced predetermined regions as a series of streams of substantially predetermined cross-sectional sizes and shapes, and an even number of capillary sheets depending from each of said collecting regions, said sheets having upper vertical sections in face to face contact, and having equally inclined branch sections diverging downwardly from said upper vertical sections and dividing said sheets into two sets of equal number of sheets, the lower discharge sections of said sheets being equally spaced, said sheets defining regular predetermined flow paths along which the liquid is adapted to flow downwardly as definite exposed curtain streams of equal unit volume.

7. A liquid distributing device for a packed tower comprising means for uniformly dispersing, merging and subdividing a liquid feed and collecting the subdivisions at spaced predetermined regions as a series of streams of substantially predetermined cross-sectional sizes and shapes, and an even number of gauze sheets depending from each of said collecting regions, said sheets having one or more vertical sections in face to face contact, and one or more equally inclined branch sections diverging downwardly from said vertical sections and dividing said sheets equally into adjoining sets of equal number of sheets, the lower discharge sections of said sheets being equally spaced, said sheets defining regular predetermined flow paths along which the liquid is adapted to flow downwardly as definite exposed curtain streams of equal unit volume.

8. A liquid distributing device for a packed tower comprising means for uniformly dispersing, merging and subdividing a liquid feed and collecting the subdivisions at spaced predetermined regions as a series of streams of substantially predetermined cross-sectional sizes and shapes, and four gauze sheets depending from each of said collecting regions, said sheets having upper vertical sections in face to face contact, equally inclined branch sections diverging downwardly from said vertical sections and dividing said sheets equally into two adjoining sets, each consisting of two sheets in face to face contact, vertical sections extending downwardly from said inclined branch sections, and equally inclined branch sections diverging downwardly from said last-mentioned vertical sections and separating all of said sheets by equal distances, said sheets defining regular predetermined flow paths along which the liquid is adapted to flow downwardly as definite exposed curtain streams of equal unit volume.

9. A liquid distributing device for a packed tower comprising a column of substantially horizontally extending layers of capillary material, each layer defining a series of oblique surfaces converging and diverging downwardly in pairs to effect substantially uniform dispersion of the liquid, fluid collecting means disposed below the column and adapted to collect the liquid dispersed by said column, said collecting means having a plurality of spaced elongated outlet slots, and liquid carrying means depending from said outlet slots and defining regular predetermined external flow paths along which the liquid flows downwardly from said fluid collecting means as definite exposed streams of substantially predetermined cross-sectional sizes and shapes.

10. A liquid distributing device for a packed tower comprising means for uniformly dispersing, merging and subdividing a liquid feed, tray means disposed below said first-mentioned means and adapted to collect the liquid dispersed thereby, and a plurality of capillary sheets depending from and in communication with the tray means, said sheets having upper vertical sections in face to face contact, and having substantially equally inclined branch sections diverging downwardly from said upper vertical sections and dividing said sheets into two sets, the lower discharge sections of said sheets being spaced from one another, said sheets defining regular predetermined flow paths along which the liquid is adapted to flow downwardly as definite exposed curtain streams of substantially predetermined cross-sectional sizes and shapes.

11. A liquid distributing device for a packed tower comprising means for uniformly dispersing, merging and subdividing a liquid feed, fluid collecting means disposed below said first-mentioned means and adapted to collect the liquid dispersed thereby, said collecting means having a plurality of spaced elongated outlet slots, and a plurality of capillary sheets depending from and in communication with said slots, said sheets having upper vertical sections in face to face contact, and having substantially equally inclined branch sections diverging downwardly from said upper vertical sections and dividing said sheets into two sets, the lower discharging sections of said sheets being spaced from one another, said sheets defining regular predetermined flow paths along which the liquid is adapted to flow downwardly as definite exposed curtain streams of substantially predetermined cross-sectional sizes and shapes.

12. A liquid distributing device for a packed tower comprising means for uniformly dispersing, merging and subdividing a liquid feed, tray means disposed below said first-mentioned means and adapted to collect the liquid dispersed thereby, and a plurality of capillary sheets depending from and in communcation with the tray means, said sheets having upper vertical sections in face to face contact, and having substantially equally inclined branch sections diverging downwardly from said upper vertical sections and dividing said sheets into two sets, the lower discharge sections of said sheets being spaced from one another, said sheets defining regular predetermined flow paths along which the liquid is adapted to flow downwardly as definite exposed curtain streams of substantially predetermined cross-sectional sizes and shapes, the widths of the discharge ends of the sheets corresponding substantially to the widths of the upper sections of the packing directly below the sheets.

13. A liquid distributing device for a packed tower comprising a column with a plurality of substantially horizontally extending superposed layers of capillary material, each layer having a series of alternate peaks and bases, the peaks of one layer being in substantially vertical alignment with the bases of the adjoining layers above and below it, fluid collecting means disposed below the column and adapted to collect the liquid dispersed by said column, said collecting means having a plurality of spaced elongated outlet slots, said layers of capillary material and said fluid collecting means being so disposed in relationship to one another that a peak of the layer of capillary material nearest said collecting means is in vertical alignment with a slot in the collecting means and the bases adjoining said last-mentioned peak are in vertical alignment with said collecting means, and liquid carrying means depending from said outlet slots and defining regular predetermined external flow paths along which the liquid flows downwardly from said fluid collecting means as definite exposed streams of substantially predetermined cross-sectional sizes and shapes.

14. In combination with a packed tower having liquid dispensing means in the upper part thereof to introduce liquid thereinto, packing below said dispensing means comprising a fabric of slender packing elements of predetermined shape arranged in accordance with a predetermined pattern to form a network provided with a plurality of vertically extending zig-zag sections having uniform alternate turns, and defining regular predetermined flow paths along which the liquid is adapted to flow in definite streams respectively, these sections being joined at equally spaced intervals to define mixing zones where the latter streams merge and then subdivide as they descend, and distributing means for the liquid from the dispensing means comprising a column of substantially horizontally extending superposed layers of capillary material in the tower disposed adjacent the liquid dispensing means to receive liquid directly therefrom, said column being in spaced relationship with the packing, each layer of the capillary material defining a series of oblique surfaces converging and diverging downwardly in pairs to effect substantially uniform dispersion of the liquid, and a series of liquid carriers depending from said layers and regularly arranged in accordance with a predetermined pattern, the carriers defining regular predetermined external flow paths along which the liquid is adapted to flow downwardly in definite exposed streams towards the packing to effect uniform mixing and distribution of the liquid throughout the flow area of the packing.

FRANCIS L. MELVILL.

REFERENCES CITED

The following references are of record in the file of this patent:

UNITED STATES PATENTS

| Number | Name | Date |
|---|---|---|
| 375,121 | Chappell | Dec. 20, 1887 |
| 1,032,657 | Briggs | July 16, 1912 |
| 1,113,643 | Jonas | Oct. 13, 1914 |
| 2,042,127 | Sayles | May 26, 1936 |
| 2,047,444 | Stedman | July 14, 1936 |
| 2,143,877 | Harte, Jr. | Jan. 17, 1939 |
| 2,198,305 | Crawford | Apr. 23, 1940 |
| 2,290,162 | Bragg | July 21, 1942 |
| 2,369,913 | Palkin et al. | Feb. 20, 1945 |
| 2,376,341 | Burk et al. | May 22, 1945 |

FOREIGN PATENTS

| Number | Country | Date |
|---|---|---|
| 23,546 | Great Britain | Oct. 25, 1907 |
| 427,087 | Great Britain | Apr. 16, 1935 |
| 149,496 | France | June 10, 1882 |
| 321,768 | Germany | June 14, 1920 |

Certificate of Correction

Patent No. 2,490,080 December 6, 1949

FRANCIS L. MELVILL

It is hereby certified that error appears in the printed specification of the above numbered patent requiring correction as follows:

Column 3, lines 52 and 53, strike out the words "substantially horizontally extending"; column 9, line 14, for "slots" read *slots 46*; and that the said Letters Patent should be read as corrected above, so that the same may conform to the record of the case in the Patent Office.

Signed and sealed this 17th day of October, A. D. 1950.

THOMAS F. MURPHY,
*Assistant Commissioner of Patents.*